US011140231B2

(12) United States Patent
Cakulev et al.

(10) Patent No.: US 11,140,231 B2
(45) Date of Patent: *Oct. 5, 2021

(54) MECHANISMS FOR ENABLING NEGOTIATION OF API VERSIONS AND SUPPORTED FEATURES

(71) Applicant: Verizon Patent and Licensing Inc., Arlington, VA (US)

(72) Inventors: Violeta Cakulev, Millburn, NJ (US); Sudhakar Reddy Patil, Flower Mound, TX (US); Robert Avanes, Roanoke, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,099

(22) Filed: Feb. 7, 2020

(65) Prior Publication Data

US 2021/0250411 A1 Aug. 12, 2021

(51) Int. Cl.
*G06F 15/16* (2006.01)
*H04L 29/08* (2006.01)
*G06F 8/71* (2018.01)

(52) U.S. Cl.
CPC ............. *H04L 67/18* (2013.01); *G06F 8/71* (2013.01); *H04L 67/16* (2013.01);
(Continued)

(58) Field of Classification Search
CPC ..... H04L 67/18; H04L 67/2819; H04L 67/16; H04L 67/2852; H04L 67/34; G06F 8/71
See application file for complete search history.

(56) References Cited

U.S. PATENT DOCUMENTS

2005/0240608 A1 10/2005 Jones et al.
2006/0136701 A1 6/2006 Dickinson
(Continued)

FOREIGN PATENT DOCUMENTS

JP 2016-152429 8/2016

OTHER PUBLICATIONS

"3rd Generation Partnership Project; Technical Specification Group Core Network and Terminals; 5G System; Network Function Repository Services; Stage 3 (Release 15)", 3GPP TS 29.510 V15.2.0, dated Dec. 2018 (Year: 2018).

*Primary Examiner* — Anh Nguyen

(57) ABSTRACT

A system includes one or more devices that include a memory to store instructions and one or more processors to execute the instructions. The devices include an updated network function (NF) service producer that includes a recent update, wherein the NF service producer is configured to register at a Network Repository Function (NRF) using a Network Function profile (NF profile), wherein the NF profile indicates a Network Function type (NF type) and Application Programming Interface versions. The devices further include a network function (NF) service consumer configured to: receive a message from a network component; determine to engage a service of a NF service producer of the NF type based on the message; and send a discovery request to the NRF in response to the message, wherein the message includes search criteria that specify a version field extended with an operator dependent version field.

20 Claims, 8 Drawing Sheets

(52) U.S. Cl.
CPC ...... *H04L 67/2819* (2013.01); *H04L 67/2852* (2013.01); *H04L 67/34* (2013.01)

(56) References Cited

U.S. PATENT DOCUMENTS

| | | |
|---|---|---|
| 2016/0092310 A1 | 3/2016 | Peacock et al. |
| 2017/0078160 A1 | 3/2017 | Hong et al. |
| 2018/0199279 A1 | 7/2018 | Baek et al. |
| 2018/0246974 A1 | 8/2018 | Shukla et al. |
| 2018/0365131 A1 | 12/2018 | Armitage |
| 2019/0174449 A1 | 6/2019 | Shan et al. |
| 2020/0007632 A1* | 1/2020 | Landais ................. H04L 67/16 |
| 2020/0015304 A1 | 1/2020 | Ma |
| 2020/0127916 A1 | 4/2020 | Krishan |
| 2020/0196375 A1* | 6/2020 | Ryu ...................... H04W 76/34 |
| 2020/0313996 A1* | 10/2020 | Krishan ............... H04L 47/125 |

* cited by examiner

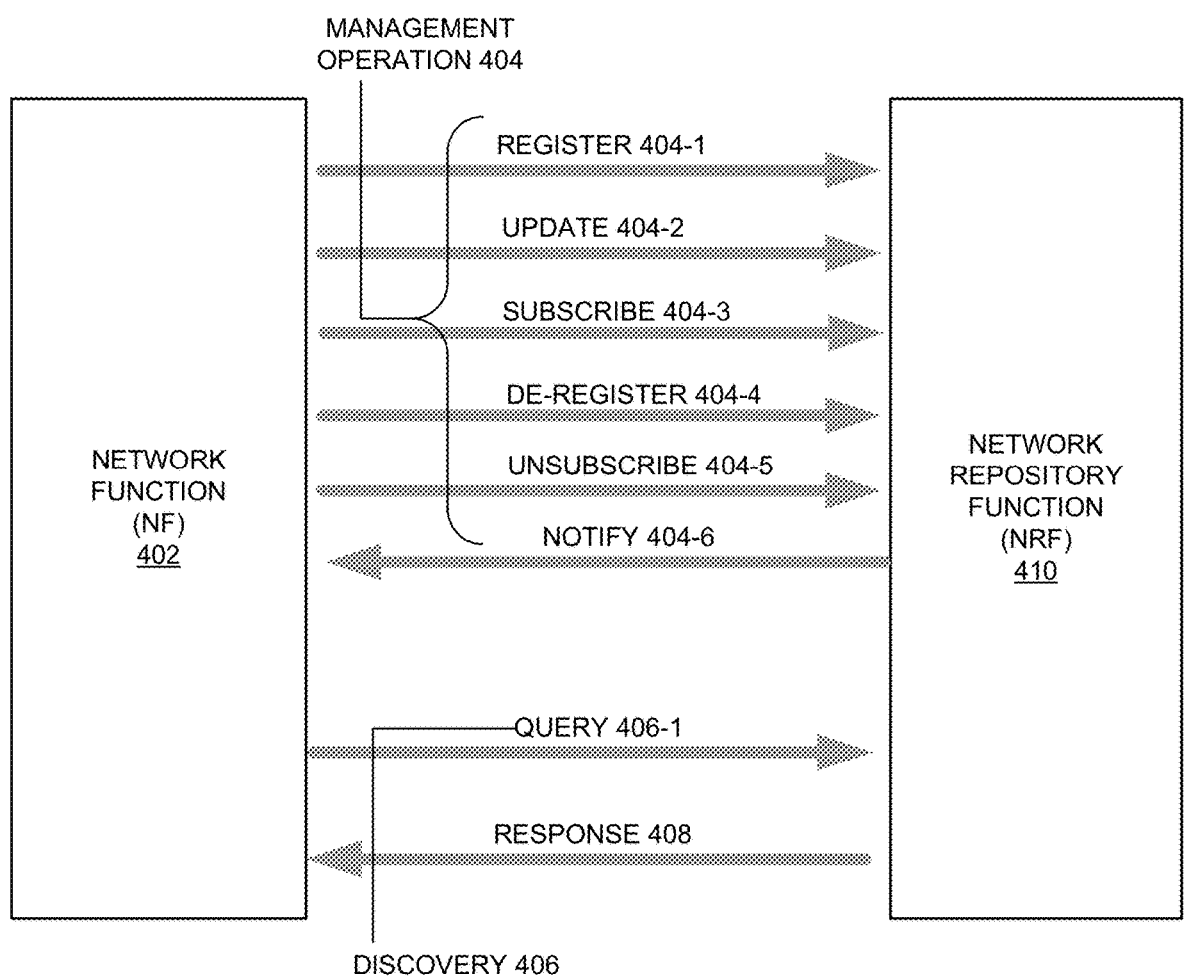

FIG. 6

| ATTRIBUTE 602 | DATA TYPE | DESCRIPTION |
|---|---|---|
| VENDOR 602-1 | String | A FIXED 6-DIGIT STRING |
| OPERATOR-FEATURES 602-2 | SupportedFeatures | OPERATOR SPECIFIED FEATURES |

MECHANISMS FOR ENABLING NEGOTIATION OF API VERSIONS AND SUPPORTED FEATURES

BACKGROUND INFORMATION

To satisfy the needs and demands of users of mobile communication devices, providers of wireless communication services continue to improve available services. One aspect of such improvements includes the ability to explore different capabilities of core network functions to adapt its service rendering mechanisms.

BRIEF DESCRIPTION OF THE DRAWINGS

FIG. 4 illustrates exemplary service calls that a network function or the Network Repository Function (NRF) may make;

FIG. 6 illustrates an exemplary definition of the Operator Specified Supported Features data type;

DETAILED DESCRIPTION OF PREFERRED EMBODIMENTS

The following detailed description refers to the accompanying drawings. The same reference numbers in different drawings may identify the same or similar elements.

A 5th Generation (5G) wireless network architecture may include different network services. Typically, in a 5G network, the services are grouped or wrapped into network functions. Each network function node, or simply "network function," registers its services with a Network Repository Function (NRF). When a particular network function needs services of other network functions, the particular network function queries the NRF to discover the other network functions or services. Thereafter, the network function may negotiate with one another for particular Application Programming Interface (API) features.

Figure 1:
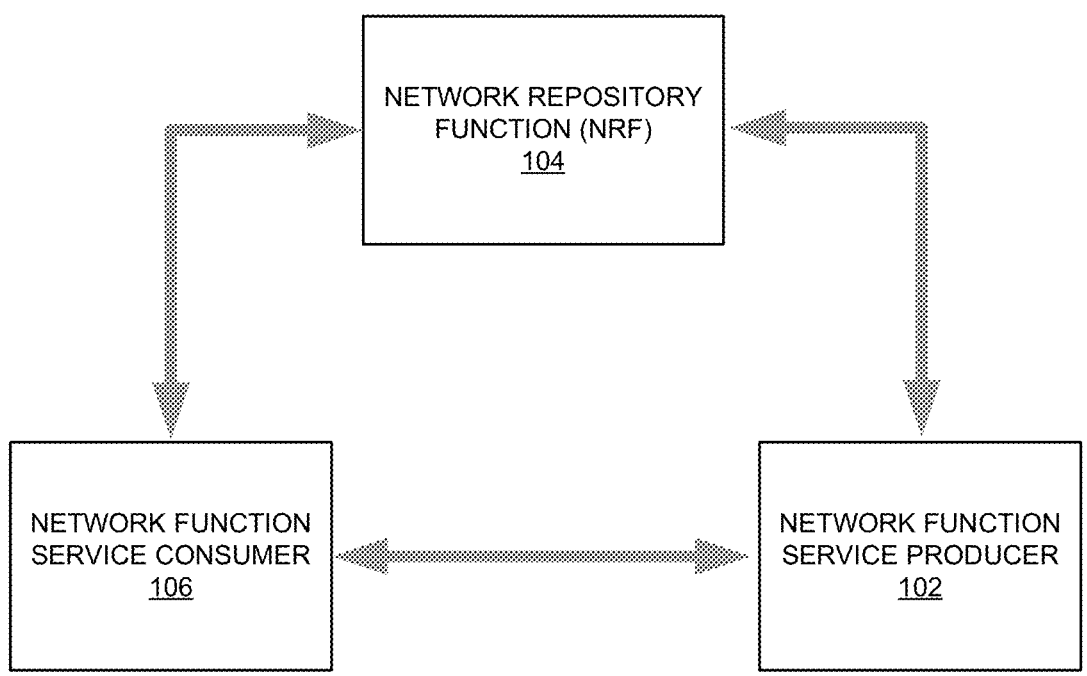
FIG. 1 illustrates concepts that are described herein.

FIG. 1 illustrates these and other concepts described herein. As shown, network function (NF) service producer 102 may register with network repository function (NRF) 104. When an NF service consumer 106 needs services of another NF, NF service consumer 106 interacts with NRF 104 to obtain information related to NF service producer 102. Thereafter, NF service consumer 106 may negotiate with NF service producer 102 for supported API features.

In FIG. 1, when NF service producer 102 registers with NRF 104, NF service producer 102 may provide API version information. The version information may include at least three fields, following the MAJOR.MINOR.PATCH string pattern. The version information may include an additional field that indicates a number for an API version under development or other relevant information.

Although the above-described mechanisms for API version registration work for negotiating and deploying specific API versions, the mechanisms may not be enough to accommodate situations in which different network operators provide different API versions, having different capabilities and backward compatibilities. In these diverse environments, for NFs to adjust its calls to other NFs and render services that match existing NF capabilities, NFs (including NF service producers and NF service consumers) need the ability to exchange operator specified API version information or other information and operator specified API features. For NFs to adjust its services with granularity that depends on specific operators, the NFs must be capable for registering operator specified API versions at NRFs as well as negotiate operator specified features with other NFs.

In the following, NFs include mechanisms that enable registration, discovery, and negotiation of operator specified API versions and features. When an NF service producer registers with an NRF, the NF service producer provides extensions (or extension fields) for API version information, in accordance with the operator policy. Specific data formats for API version registration are described below with reference to FIG. 5C. Once an NF service producer fully registers the API versions with the NRF, the NF service producer and its API versions can be discovered by an NF service consumer. The NF consumer can discover other NFs by sending discovery requests to the NRF. When the NF service consumer receives the identities of NF service producers that meet the criteria given in the request, the NF service consumer can negotiate with the NF service producers for operator specified supported features. During the negotiation, the NF service consumer may query the NF service producer for information regarding operator specified supported features, as described below with reference to FIG. 6.

Figure 2:
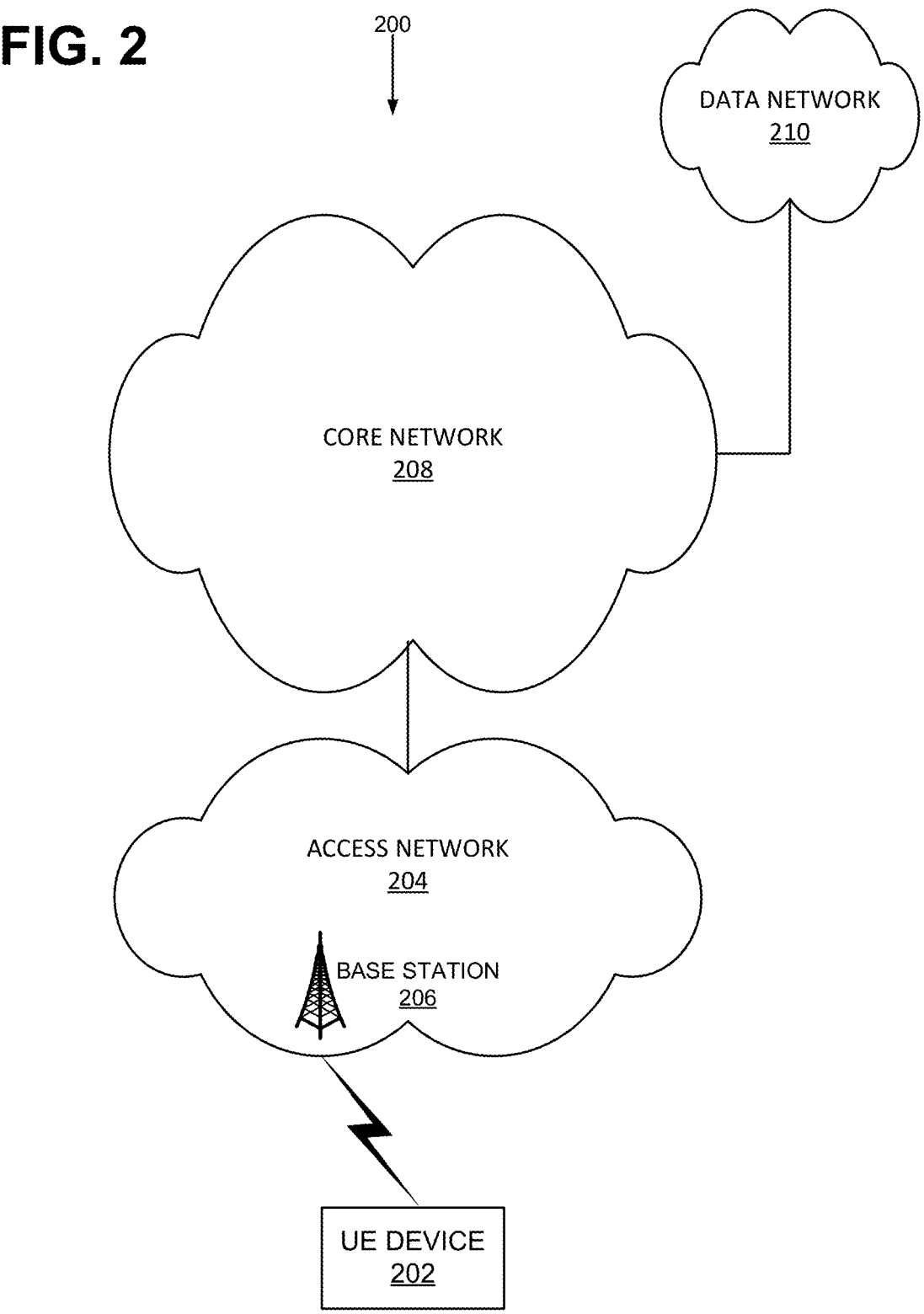
FIG. 2 illustrates an exemplary network environment in which the concepts associated with FIG. 1 may be implemented.

FIG. 2 illustrates an exemplary network environment 200 in which the above-described concepts may be implemented. As shown, network environment 200 may include a UE device 202, an access network 204, a core network 208, and a data network 210. Depending on the implementation, network environment 200 may include additional networks and components than those illustrated in FIG. 2. For simplicity, FIG. 2 does not show all components that may be included in network environment 200 (e.g., routers, bridges, wireless access point, additional UE devices, switches, etc.).

UE device 202 may include a wireless computational, communication device. Examples of UE device 202 include: a smart phone; a tablet device; a wearable computer device (e.g., a smart watch); a global positioning system (GPS) device; a laptop computer; a media playing device; a portable gaming system; an Internet-of-Things (IoT) device. In some implementations, UE device 202 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

Access network 204 may allow UE device 202 to access core network 208. To do so, access network 202 may establish and maintain, with participation from UE device 202, an over-the-air channel with UE device 202; and maintain backhaul channels with core network 208. Access network 204 may relay information through these channels, from UE device 202 to core network 208 and vice versa.

Access network 204 may include a Long-term Evolution (LTE) radio network and/or a 5G radio network or other advanced radio network. These networks may include many wireless stations, one of which is illustrated in FIG. 2 as base station 206 for establishing and maintaining over-the-air channel with UE device 202.

Base station 206 may include a 4G, 5G, or another type of base station (e.g., eNB, gNB, etc.) that includes one or more radio frequency (RF) transceivers. Base station 206 may provide or support one or more of the following: carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; MTC-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; and other types of LTE-Advanced (LTE-A) and/or 5G-related functions. In some implementations, base station 206 may be part of an evolved UMTS Terrestrial Network (eUTRAN).

Core network 208 may include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., 4th Generation (4G) core network), a 5G core network, an ad hoc network, a telephone network (e.g., the Public Switched Telephone Network (PSTN), an intranet, or a combination of networks. Core network 208 may allow the delivery of Internet Protocol (IP) services to UE device 202, and may interface with other external networks, such as a data network 210. Core network 306 may include or be connected to one or more packet data networks.

Data network 210 may include different types of data networks, such as a packet data network. An example of a packet data network includes an Internet Multimedia Subsystem (IMS) network, which may provide video, Voice-over-IP (VoIP), text, or other types of media services.

Although not shown, core network 208 in FIG. 2 may include various network functions (NFs), such an NF service consumer, an NF service producer, and an NRF. Various NFs in core network 208 are described below with reference to FIG. 8. These NFs may register their APIs with the NRF, perform discovery functions for operator specified API versions, and negotiate for operator specified supported features with other NFs.

Figure 3:
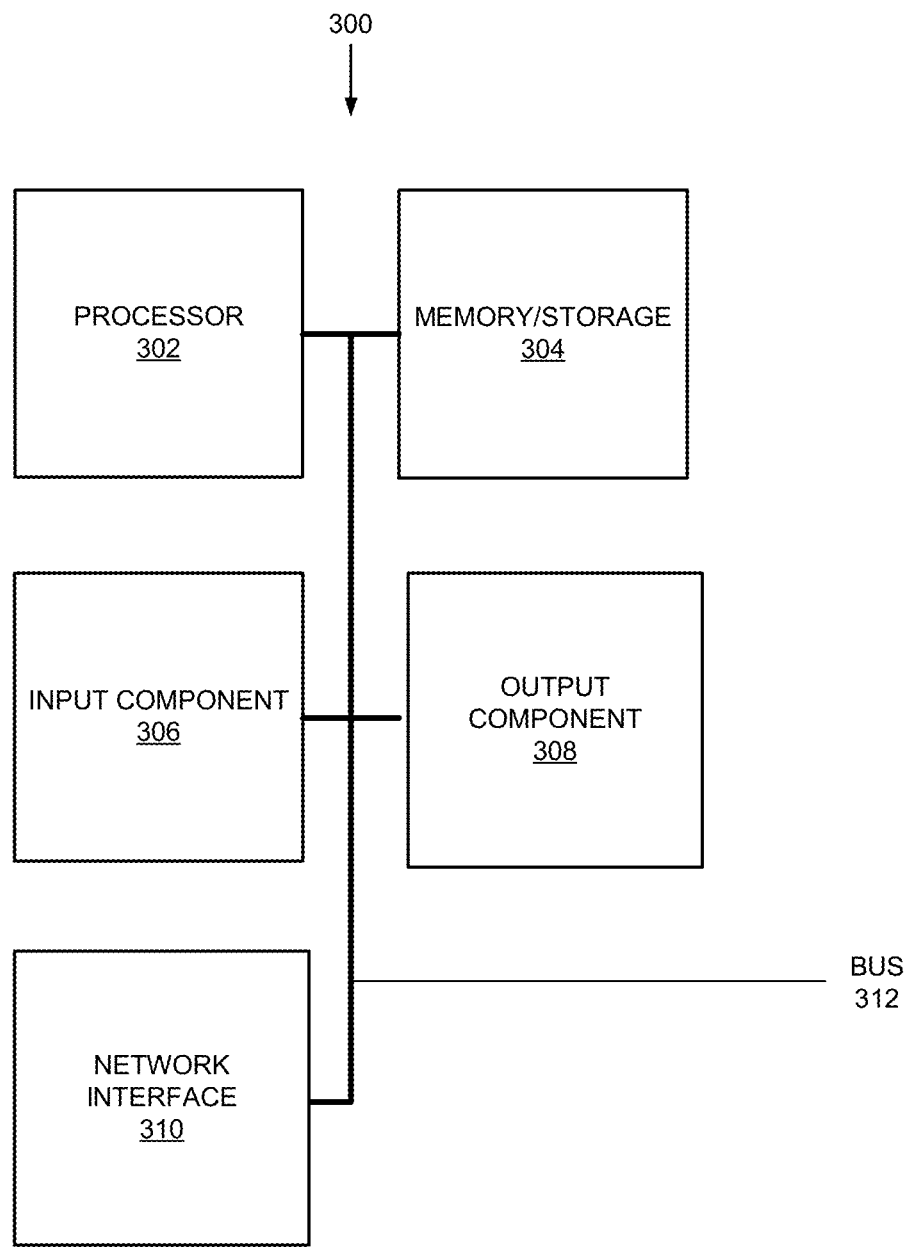
FIG. 3 depicts exemplary components of an exemplary network device of FIG. 2.

FIG. 3 depicts exemplary components of an exemplary network device 300. Network device 300 may correspond to or be included in any of the devices and/or components illustrated in FIG. 2 (e.g., UE device 202, access network 204, core network 208, data network 210, etc.). In some implementations, network devices 300 may be part of a hardware network layer on top of which other network layers and NFs may be implemented.

As shown, network device 300 may include a processor 302, memory/storage 304, input component 306, output component 308, network interface 310, and communication path 312. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from network device 300. Input/output components 306 and 308 may include a display screen, a keyboard, a mouse, a speaker, a microphone, a camera, a DVD reader, USB lines, and/or other types of components for obtaining, from physical events or phenomena, to and/or from signals that pertain to network device 300.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc. Network interface 310 may include a modem, an Ethernet interface to a LAN, and/or an interface/connection for connecting network device 300 to other devices (e.g., a Bluetooth interface).

Communication path 312 may provide an interface through which components of network device 300 can communicate with one another.

Network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein.

For example, when an NF service consumer and an NF service producer are implemented, the network device 300 may execute computer instructions that correspond to the NFs. In another example, when a NF registers an operator specified API versions at an NRF or when a network function queries the NRF for an operator specified API version, network devices 300 may execute computer instructions corresponding to the registration and the query.

FIG. 4 illustrates an exemplary set of service calls that a network function 402 (which may be an NF service consumer or an NF service producer) or a Network Repository Function (NRF) NRF 410 may make to perform one of several management operations or a discovery operation. As shown, management operations 404 may include: register 404-1, update 404-2, deregister 404-3, subscribe 404-4, unsubscribe 404-5, and notify 404-6. Discovery operation 406 may include a query 406-1. In an exemplary implementation, these operations are performed through Representational State Transfer (REST) API calls with one or more arguments (i.e., data) having a specific JavaScript Object Notation (JSON) structure or format. The data structures are described below with reference to FIGS. 5A-5C. When invoked, the management operations 404 result in exchange of API version information that may be used for selecting specific calls or transaction requests to other network functions. Depending on the implementation, management operations 404 may include additional, fewer, or different operations than those illustrated in FIG. 4 (e.g., an Authorization operation).

Register operation 404-1 may be invoked by network function 402. The call is accompanied by a description of the calling network function 402 (e.g., the calling network function 402 sends the description to NRF 410). When NRF 410 receives the registration request, NRF 410 may store the description of the calling network function 402 at a local storage (e.g., a persistent storage). The description (herein referred to as "NF profile" or "profile") may include information needed by an NF service consumer (i.e., a network function 402 that is serviced by the particular network function 402). Component fields of a NF profile are described below with reference to FIG. 5B.

Update operation 404-2, when invoked by a network function 402 at NRF 410, causes NRF 410 to update the registered information associated with the network function 402. When calling update operation 404-2, network function 402 may provide NRF 410 with the replacement NF profile.

Subscribe operation 404-3 permits a network function 402 to subscribe to the notification service offered by NRF 410. After a network function 402 subscribes at NRF 410, the network function 402 may receive notifications when other different network functions 402 register, deregister, and/or update their NF profiles at NRF 410.

Deregister operation 404-4 and unsubscribe operation 404-5, when invoked by network function 402, cause NRF 410 to remove the NF profile from the storage at NRF 410 and to stop notifying the network function 402, respectively. Notify operation 404-6 may be performed by NRF 410 to provide notifications to NFs that subscribed with NRF 410.

Discovery operation 406, when invoked by network function 404, allows network function 404 to obtain information from NRF 410 about other network functions. An example of discovery operation 406 includes a query 406-1. Discovery operation 406 is performed via the HTTP GET command, issued with HTTP query parameters.

In response to both management operations 404 and discovery operation 406 by network function 402, NRF 410 may generate a response 408. For example, if the operation is a management operation 404, NRF 410 may provide a response 408 that reflects the NF profile. In another example, if the network operation is a query 406-1, NRF 410 may provide a response that includes a list of Uniform Resource Identifiers (URIs). The URIs may correspond to network functions 402 and/or NF services whose NF profiles match the query criteria.

Figure 5A:
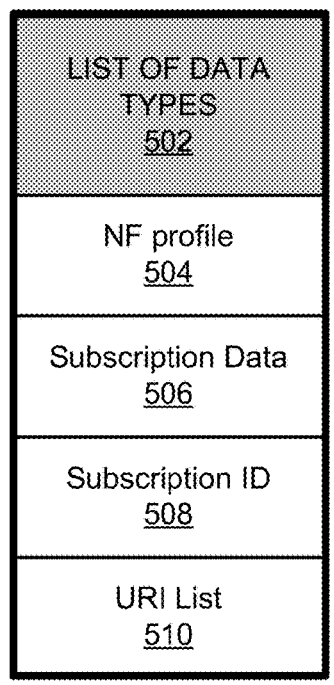
FIG. 5A illustrates a list of exemplary data types that may flow between the network functions (NFs) and the NRF.

FIG. 5A illustrates a list 502 of exemplary data types that may flow between network functions 402 and NRF 410 during management operation 404 and discovery operation 406. As shown, list 502 may include NF profile 504, Subscription Data 506, Subscription ID 508, and URI List 510. Depending on the implementation, each of the types 504-510 may be a compound datum that includes additional information related to network functions and services. Although not shown, depending on the implementation, network functions 402 and NRF 410 may exchange additional, fewer, or different types of data than those illustrated in FIG. 5A.

NF profile 504 may include information that describes a particular network function 402. As indicated above, network function 402 may send NF profile 504 (or another type of data) during management operations 404 (e.g., registration). NF profile 504 is described below in greater detail with reference to FIG. 5B.

Subscription Data 506 may be sent by a network function 402 to NRF 410 when the network function 402 subscribes to the notification service offered by NRF 410. Subscription Data 506 may include information that NRF 410 may use to determine what and when network function 402 is to be notified by NRF 410. For example, Subscription Data 506 may indicate for how long the network function 402 is to receive notifications from NRF 410, what events the network function 402 is to be notified of (e.g., registration of another network function 402, registration, updates, deletion or removal, etc.), the name of the service to be notified about, the type of network function 402 to be notified about, etc.

Subscription ID 508 may include an identifier that uniquely identifies a particular subscription. When a network function 402 sends a request for a subscription to NRF 410, NRF 410 may generate and send a subscription ID 508 to the network function 402 for later use. The network function 402 may submit the subscription ID 508 to NRF 410, for example, when the network function 402 requests NRF 410 to unsubscribe to the notification service.

URI List 510 may include a list of URIs. Many information exchanges between network functions 402 and NRF 410 may include one or more URI Lists 510. For example, when network function 402 sends a discovery or search request to NRF 410 for a list of network functions 402 and services that match its search criteria, NRF 410 may return a URI list 510. Each item designated by the corresponding URI in the URI List 510 would satisfy the search criteria provided by the network function 402 requesting the search.

Figure 5B:
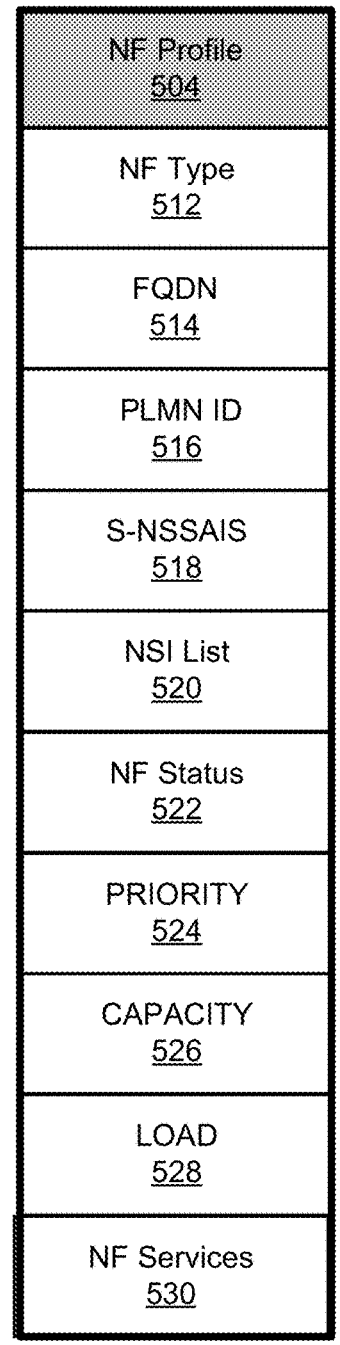
FIG. 5B illustrates exemplary data components of an NF profile.

FIG. 5B illustrates an exemplary list of components 512-530 of NF Profile 504. As shown, NF profile 504 may include a NF type 512, Fully Qualified Domain Name (FQDN) 514, PLMN ID 516, S-NSSAIs 518, NSI List 520, NF Status, 522, priority 524, capacity 526, load 528, and one or more of NF service 530. Although NF profile 504 may include additional, fewer, or different data components, for simplicity, they are not illustrated in FIG. 5B.

NF type 512 may include a string that identifies the type of network function 402 which sent the NF profile 504 to NRF 410 and the type of network function 402 that NF profile 504 describes. For example, NF type 512 may include a string "SMF," which indicates that the network function 402 is a Session Management Function (SMF). Examples of other possible NF type 512 values include: "AF," "NRF," "UDM," "AMF," "AUSF," "NEF", and "PCF." These strings may correspond to, respectively, an Application Function (AF), a Network Repository Function (NRF), a User Data Management (UDM), an Access and Mobility Management Function (AMF), an Authentication Server Function (AUSF), a Network Exposure Function (NEF), and a Policy Control Function (PCF). Some of these and other network functions 402 are described below with reference to FIG. 8.

FQDN 514 may include a fully qualified domain name of network function 402 which NF profile 512 describes. PLMN ID 516 identifies the Public Land Mobile Network (PLMN) of the network function 402.

S-NSSAIs 518 is a list or an array of information, S-NSSAI. Each S-NSSAI includes: (A) a network slice/service type and (B) information for differentiating one network slice from another. The collection of S-NSSAIs 518 may also be referred to as Network Slice Selection Assistance Information (NSSAI). As used herein, the term "network slice" may refer to a logical network that provides specific network capabilities and network characteristics. The logical network, for example, may be a virtual network comprising network functions 402. Thus, a physical network may be "sliced" into multiple network slices.

NSI List 520 may include a list of Network Slice Instance (NSI) identities of the network function 402. NF status 522 indicates whether network function 402 is capable of being discovered by other network functions 402 or not capable of being discovered by other network functions 402.

Priority 524 may include a value that indicates the priority of network function 402 over other network functions 402 of the same type. In one implementation, priority 524 may include a numerical value (i.e., an integer) in the range of 0-65535, in which lower values indicate higher priorities. If values of priorities are present for the services that the network function 402 provides, those priority values may have precedence over priority 524.

Capacity 526 may provide capacity information for the network function 402 described by NF profile 504. In one implementation, capacity 526 may include an integer value (e.g., in the range of 0-65535) that denotes a weight relative to other network functions 402 of the same type. If values for capacities are also present for the specific services that the network function 402 provides, those capacity values may have precedence over capacity 526.

Load 528 may indicate the current load of network function 402 in terms of percentage. In one implementation, load 528 may be an integer value in the range 0-100. NF services 530 may include a list or array of information. Each item in the list or the array may describe a service that network function 402 provides.

Figure 5C:
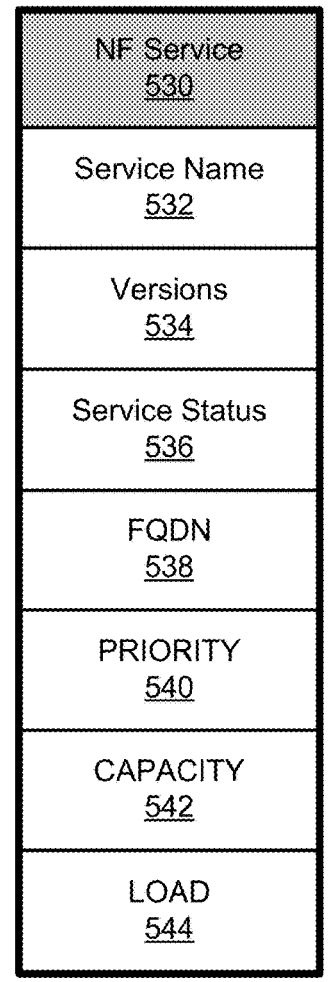
FIG. 5C illustrates exemplary data components of an NF service of FIG. 5B.

FIG. 5C illustrates an exemplary list of data components of NF service 530. As shown, NF service 530 may include Service Name 532, Versions 534, Service Status 536, FQDN 538, priority 540, capacity 542, and load 544. Although NF service 530 may include additional, fewer, or different data components, for simplicity, they are not illustrated in FIG. 5C.

Service Name 532 may indicate the name of service that NF service 6530 describes. For example, assume that a network function 402 is NRF 410, and that service Name 532 is a string "nnrf-nfm." The string identifies the Nnrf NFManagement Service, which is offered by NRF 410.

Versions 534 include a list or array of version data. Each version data provides information for a API version supported by the NF Service 530. In some implementations, each of versions 534 may include three fields having the format MAJOR.MINOR.PATCH, where MAJOR, MINOR, and PATCH are version fields having integer values. The version data may also include the corresponding retirement date of the NF service 530.

Service status 536 indicates whether NF service 530 is capable of being discovered by other network functions 402 or not capable of being discovered by other network functions 402. FQDN 538 may include a fully qualified domain name of the service described by NF Service 530.

Priority 538, capacity 540, and load 542 are similar to priority 524, capacity 526, and load 528. In contrast to priority 524, capacity 526, and load 528, however, priority 540, capacity 542, and load 544 apply to the service described by NF Service 530.

With management operations 404 and discovery operation 506 in place as described above with reference to FIG. 4 and data types in place as described above with reference to FIGS. 5A-5C, network functions 402 may register operator specified API versions at NRF 410. More specifically, network functions 402 may forward version information for the fields of version 534 to NRF 410 (e.g., as part of NF profile 504).

To allow exchange of information on operator specified API versions, when network functions 402 forward data for version 534 to NRF 410, network functions 402 may include within the data, information that extends the format MAJOR.MINOR.PATCH described above. That is, the version data may include an extension fields that follow the MAJOR.MINOR.PATCH to convey the operator specified API version information.

In some implementations, the extension fields that follow or are subsequent to MAJOR.MINOR.PATCH may include a string of the format OPERATOR-X-Y-Z. OPERATOR is the name of the operator. X is either 0 or 1 and may indicate whether the operator specified extensions are backward compatible with a standard API version (e.g., 3GPP API standard); Y is a numerical value that is incremented when there is a backward incompatible change to the API for a given operator specified release; and Z is a numerical value that is incremented when there is a backward compatible change/correction to the API for a given operator specified release. Z field is reset to "0" if the Y field is changed.

After network function 402 (e.g., an NF service producer) registers and/or updates its full version numbers for all fields with NRF 410, an NF service consumer may discover the supported API version of the NF service producer, either by (1) issuing a query 406-1 to retrieve from NRF 410 the NF profile of the NF service producer; or (2) receiving NF profile change notifications from NRF 410. For the latter, the NF service consumer must have subscribed NRF 410 to receive NF status change notifications. Once the NF service consumer has subscribed, NRF 410 may subsequently notify the NF service consumer of any change to the NF profile. The notification may include an updated NF service profile containing the current list of NF services and their versions supported by the NF service producer.

After an NF service producer registers API versions with NRF 410, an NF service consumer may send queries to NRF 410 to obtain a list of NF service producers, for which their APIs match the search criteria. For example, an NF service consumer may send a query to NRF 410 for a list of service versions that match all fields of API version numbers, if, for example an operator made specific changes that are backward incompatible with the major release of the API. In another example, the NF service consumer may forward a query to NRF 410 for matching only the major release field of API version number (i.e., MAJOR), if for example an operator made operator specified changes that are backward compatible with the major release of API version. In yet another example, the NF service consumer may query for a match of only a portion of the operator specified fields of API version numbers.

After the NF service consumer discovers supported API version(s) of the NF service producer, depending on use case and configuration, the NF service consumer may use the discovered information to negotiate operator specified supported APIs with the NF service producers. For each negotiation, the NF service consumer and NF service producer may exchange a specific type of data, herein referred to as Operator Specified Supported Features.

FIG. 6 illustrates an exemplary definition of the Operator Specified Supported Features data type. As shown, each datum of the type Operator Specified Supported Features may include at least two attributes: VENDOR and OPERATOR-FEATURES. In other implementations, Operator Specified Supported Features may include additional or fewer attributes than those illustrated in FIG. 6.

VENDOR may include a string of fixed length. In one implementation, VENDOR may include a 6-digit string. The string may include an Internet Assigned Numbers Authority (LANA) assigned Structured Management Information (SMI) Network Management Private Enterprise Code (SMI NMPEC) pre-pended with leading zeros to complete the 6-digit value.

OPERATOR-FEATURES may include the attribute Supported Features data type. Supported Features includes a string used to indicate the features supported by an API. In some implementations, the string may contain a bitmask indicating supported features in hexadecimal representation. Each character in the string may take a value of "0" to "9" or "A" to "F" and represent the support of features. The most significant character representing the highest-numbered features may appear first in the string, and the character representing features 1 to 4 may appear last in the string. The list of features and their numbering (starting with 1) may be defined separately for each API. If the string contains a lower number of characters than there are defined features for an API, all features that would be represented by characters that are not present in the string may not be supported.

In one implementation, an NF service consumer and an NF service producer may negotiate supported features in a manner similar to the one described in 3GPP standards. When negotiating, an NF service consumer may send a message to an NF service producer. The message may include an attribute of the Operator Specified Supported Features data type. The attribute indicates which of the operator specified optional features defined for the corresponding service are supported by the NF Service consumer. The NF service producer determines the supported features for the corresponding resource by comparing the supported features indicated by the message from the NF service consumer with the supported features by the NF service producer. Features that are supported by both the NF service producer and the NF service consumer are supported for that resource. In responding to the NF service consumer, the NF service producer lists all the features (given by the Operator Specified Supported Features data type) that it supports, in its reply message to the NF service consumer.

Figure 7:
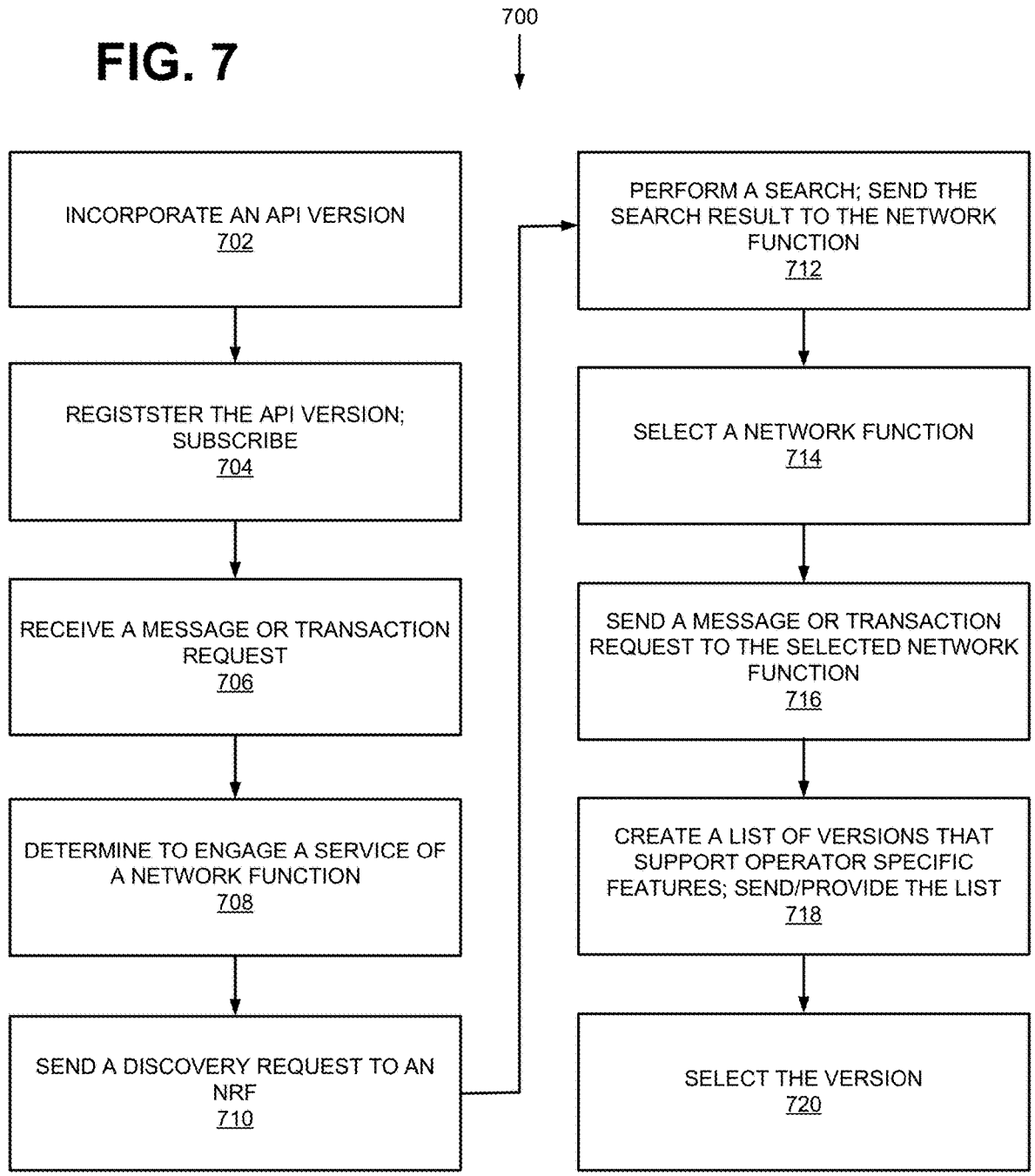
FIG. 7 is a flow diagram of an exemplary process associated with negotiating Application Programming Interface (API) versions and supported features.

FIG. 7 is a flow diagram of an exemplary process 700 associated with negotiating operator specified supported features. Process 700 may be performed by network functions 402 and/or NRF 410. Network functions 402 may be implemented by one or more network devices whose processors 302 execute computer-executable instructions (e.g., software).

As illustrated in FIG. 7, process 700 may include incorporating a version of an API of an NF service producer 402 (block 702). The incorporation may include releasing and instantiating the NF with the updated API into its operating environment (e.g., core network 208, a test environment, production environment, etc.). Process 700 further includes the NF service producer registering with NRF 410 or updating its profile with NRF 410 (block 704). As explained above, the registration or the update may include NF service producer 402 sending an updated NF profile to NRF 402. In some implementations, process 700 may involve other NFs 402, which are interested in the API updates, subscribing to NRF 410 to receive notifications when the NF service producer 402 updates its NF profile at NRF 410 (e.g., for its new version of the API).

Process 700 further includes a NF service consumer 402 receiving a message or a transaction request, for example, from another network function 402 (block 706). The message may trigger NF service consumer 402 to perform a number of actions. For example, in response to the message, the NF service consumer 402, which receives the message, determines that it is to engage a particular type of NF 402 (block 708). At this point, NF service consumer 402 may not be aware of all the API versions available for different instances of the NF service producer type that it wishes to engage. As described further below, NF service consumer 402 may select a particular API version and the NF service producer instance that offers the API version based on information that NF service consumer 402 obtains from NRF 410 and/or the NF service producers of a particular NF type.

Process 700 may include sending a discovery request to an NRF 410 (block 710) in response to the transaction request (block 710). The query may include criteria, for example, that requires NRF 410 to provide a matching list of version fields. As described above, the version fields may include OPERATOR-X-Y-Z fields. The query may require, for example, NRF 410 to match all fields of API version numbers (e.g., OPERATOR-X-Y-Z) to obtain, for example, a list of versions that are backward incompatible with the major release of API version. In another example, the query may require matching only the major release field of API version number (i.e., MATCH). In yet another example, the query may require a match of only a portion of the operator specified field of API version numbers.

When the NRF 410 receives the discovery request from the NF service consumer 402, NRF 410 performs a search, in a database or other storage device, for a list of NF profiles that match the query terms (block 712). For each NF profile that matches the query terms, the NRF 410 obtains an URI associated with the network function corresponding to the matching NF profile, such as the specific fields of the version fields. The NRF 410 aggregates the URIs into a URI list, and sends the URI list as part of a search result to the NF service consumer 402 (block 712).

Process 700 may further include selecting, among the network functions identified by the list of URIs received from the NRF 410, a network function based on the values of the version fields associated with the NF service producers identified by the list of URIs (block 714). Depending on the implementation, the selection may depend on backward compatibility of available versions to a desired version, for example.

Process 700 may include sending a message to the selected NF service producers 402 (block 716), to negotiate operator specified supported features. The message may include Operator Specified Supported Features. That is, the request may require specific features that only certain operators implemented. When NF service producer 402 assembles a list of its API versions whose operator specified features match the required attributes (e.g., SupportedFeatures), NF service producer 402 may create the list in its reply to NF service consumer 402 (block 718) and forward a message that includes the list to NF service consumer 402. In response to the message, NF service consumer 402 may select one of the versions in the list (and/or additional lists from other NF service producers 402 which the NF service consumer has been negotiating) and use the selected version of the API to call NF service producer 402 (block 720).

Figure 8:
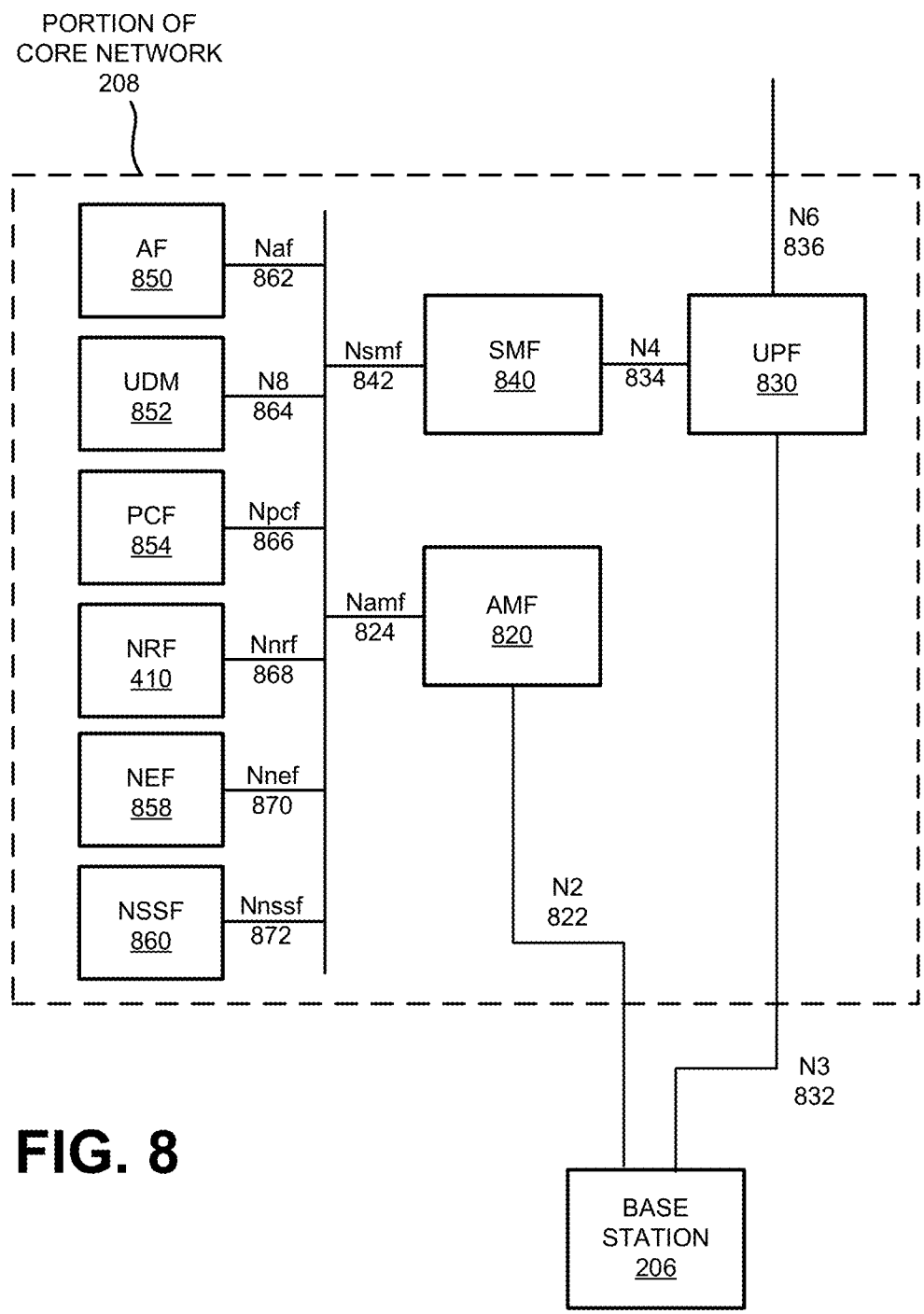
FIG. 8 illustrates exemplary network functions of the core network of FIG. 2.

FIG. 8 illustrates exemplary network functions 402 in a portion of core network 208 of FIG. 2. As shown, the network functions 402 (which may act as an NF service consumer and/or an NF service producer) include: an Access and Mobility Function (AMF) 820, a User Plane Function (UPF) 830, a Session Management Function (SMF) 840, an Application Function (AF) 850, a Unified Data Management (UDM) 852, a Policy Control Function (PCF) 854, a Network Repository Function (NRF) 410, a Network Exposure Function (NEF) 858, and a Network Slice Selection Function (NSSF) 860. N2 822, Namf 824, N3 832, N4 834, N6 836. Nsmf 842. Naf 862, N8 864, Npcf 866, Nnrf 868, Nnef 870 and Nnssf 872 are 3GPP-Service Based Interfaces (SBIs).

AMF 820 may perform registration management, connection management, reachability management, mobility management, lawful intercepts, Short Message Service (SMS) transport between UE device 202 and an SMS function, session management message transport between UE device 202 and SMF 840, access authentication and authorization, location services management, support of non-3GPP access networks, and/or other types of management processes. AMF 820 may page UE device 202 based on mobility category information associated with UE device 202 obtained from UDM 852. In some implementations, AMF 820 may implement some or all of the functionality of managing RAN slices in base station 206. AMF 820 may be accessible by other function nodes via Namf interface 824.

UPF 830 may: maintain an anchor point for intra/inter-RAT mobility (e.g., mobility across different radio access technologies (RATs); maintain an external Packet Data Unit (PDU) point of interconnect to a data network (e.g., an IP network, etc.); perform packet routing and forwarding; perform the user plane part of policy rule enforcement; perform packet inspection; perform lawful intercept; perform traffic usage reporting; perform Quality-of-Service (QoS) handling in the user plane; perform uplink traffic verification; perform transport level packet marking; perform downlink packet buffering; send and forwarding an "end marker" to a Radio Access Network (RAN) node (e.g., base station 206); and/or perform other types of user plane processes. UPF 830 may communicate with SMF 840 using an N4 interface 834 and connect to IP network using an N6 interface 836.

SMF 840 may: perform session establishment, modification and/or release; perform IP address allocation and management; perform Dynamic Host Configuration Protocol (DHCP) functions; perform selection and control of UPF 830; configure traffic steering at UPF 830 to guide traffic to the correct destination; terminate interfaces toward PCF 854; perform lawful intercepts; charge data collection; support charging interfaces; control and coordinate charging data collection; terminate session management parts of NAS messages; perform downlink data notification; manage roaming functionality; and/or perform other types of control plane processes for managing user plane data. SMF 840 may be accessible via Nsmf interface 842.

AF 850 may provide services associated with a particular application, such as, for example, application on traffic routing, accessing NEF 858, interacting with a policy framework for policy control, and/or other types of applications. AF 850 may be accessible via Naf interface 862.

UDM 852 may: maintain subscription information for UE devices 202; manage subscriptions; generate authentication credentials; handle user identification; perform access authorization based on subscription data; perform network function registration management; maintain service and/or session continuity by maintaining assignment of SMF 840 for ongoing sessions; support SMS delivery, support lawful intercept functionality; and/or perform other processes associated with managing user data. For example, UDM 852 may store subscription profiles that include authentication, access, and/or authorization information. Each subscription profile may include: information identifying UE device 202; authentication and/or authorization information for UE device 202; information identifying services enabled and/or authorized for UE device 202; device group membership information for UE device 202; and/or other types of information associated with UE device 202. Furthermore, the subscription profile may include mobility category information associated with UE device 202. UDM 852 may be accessible via N8 interface 864.

PCF 854 may support policies to control network behavior, provide policy rules to control plane functions (e.g., to SMF 840), access subscription information relevant to policy decisions, perform policy decisions, and/or perform other types of processes associated with policy enforcement. PCF 854 may be accessible via Npcf interface 866. NRF 410 has been discussed above. NRF 410 may be accessible via Nnrf interface 968.

NEF 858 may expose capabilities and events to other NFs, including third party NFs, AFs, edge computing NFs, and/or other types of NFs. Furthermore, NEF 858 may secure provisioning of information from external applications to network 208, translate information between core network 208 and devices/networks external to access network 204, support a Packet Flow Description (PFD) function, and/or perform other types of network exposure functions. NEF 858 may be accessible via Nnef interface 870.

NSSF 860 may select a set of network slice instances to serve a particular UE device 202, determine network slice selection assistance information (NSSAI), determine a particular AMF 820 to serve a particular UE device 202, and/or perform other types of processes associated with network slice selection or management. NSSF 860 may be accessible via Nnssf interface 872.

Although FIG. 8 depicts a portion of core network 208 as having a single AMF 820, UPF 830, SMF 840, AF 850, UDM 852, PCF 854, NRF 856, NEF 858, and/or NSSF 860 for simplicity, in practice, core network 208 may include multiple AMFs 820, UPFs 830, SMFs 840, AFs 850, UDMs 852, PCFs 854, NRFs 856, NEFs 858, and/or NSSFs 860. Furthermore, core network 208 may include fewer components, different components, differently arranged components, or additional components than depicted in FIG. 8. For example, network 208 may include additional function nodes not shown in FIG. 8, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), and/or other types of functions, other types of devices, components, etc.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 7, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
one or more devices that include instructions and one or more processors to execute the instructions, wherein when the one or more processors execute the instructions, the one or more processors instantiate, in a memory:
an updated network function (NF) service producer that includes a recent update, wherein the updated NF service producer is configured to register at a Network Repository Function (NRF) using a Network Function profile (NF profile), wherein the NF profile indicates a Network Function type (NF type) and Application Programming Interface (API) versions associated with the recent update; and
an NF service consumer configured to:
receive a message from a network component;
determine to engage a service of an NF service producer of the NF type based on the message;
send a discovery request to the NRF in response to the message, wherein the discovery request includes search criteria;
receive a search result from the NRF in response to the discovery request, wherein the search result includes a list of NFs that meet the search criteria;
select a particular NF from the list of NFs;
receive a list of different versions of the API from the particular NF;
select a particular version of the API, from the received list of different versions of the API; and
use the selected particular version of the API to call the particular NF.

2. The system of claim 1, wherein the NF service consumer is further configured to:
send a request to negotiate an operator specified API version, wherein the request includes an Operator Specified Supported Features data that specifies a vendor.

3. The system of claim 2,
wherein the particular NF has an API that matches the Operator Specified Supported Features data.

4. The system of claim 2, wherein the Operator Specified Supported Features data includes a Supported Features attribute, wherein the Supported Features attribute includes a string that indicates features supported for an API.

5. The system of claim 4, wherein the list identifies NFs of the NF type, and wherein the the NFs support API versions consistent with an operator dependent version field in the search criteria.

6. The system of claim 1, wherein the search criteria comprise a version field that includes a string indicating a major release version, a minor release version, and a patch version.

7. The system of claim 1, wherein the search criteria comprise an operator dependent version field that includes a string specifying an operator that provides the API and indicates whether an operator specified API is backward compatible with a standard API version, whether the operator specified API is backward compatible with an operator specified release, and whether there is a backward compatible changes to the API.

8. The system of claim 1, wherein the NF type specifies one of:
Application Function (AF);
Access and Mobility Management Function (AMF);
Authentication Server Function (AUSF);
Network Exposure Function (NEF); and
Policy Control Function (PCF).

9. The system of claim 1, wherein the list of NFs includes a list of Uniform Resource Identifiers (URIs) that identify the NFs.

10. A method comprising:
registering, by an updated network function (NF) service producer, which is implemented by one or more network devices, at a Network Repository Function (NRF) using a Network Function profile (NF profile), wherein the NF profile indicates a Network Function type (NF type) and Application Programming Interface versions;

receiving, by an NF service consumer, a message from a network component;

determining, by the NF service consumer, to engage a service of an NF service producer of the NF type based on the message;

sending, by the NF service consumer, a discovery request to the NRF in response to the message, wherein the discovery request includes search criteria;

receiving, by the NF service consumer, a search result from the NRF in response to the discovery request, wherein the search result includes a list of NFs that meet the search criteria;

selecting, by the NF service consumer, a particular NF from the list of NFs;

receiving, by the NF service consumer, a list of different versions of the API from the particular NF;

selecting, by the NF service consumer, a particular version of the API, from the received list of different versions of the API; and using, by the NF service consumer, the selected particular version of the API to call the particular NF.

11. The method of claim 10, wherein the list identifies NFs of the NF type, and wherein the the NFs support API versions specified by an operator dependent version field in the search criteria.

12. The method of claim 10, further comprising:

sending, by the NF service consumer, a request to negotiate an operator specified API version to the NFs, wherein the request includes an Operator Specified Supported Features data that specifies a vendor.

13. The method of claim 12, wherein the particular NF has an API that matches the Operator Specified Supported features data.

14. The method of claim 12, wherein the Operator Specified Supported Feature data includes a Supported Features attribute, wherein the Supported Features attribute comprises a string that indicates features supported for an API.

15. The method of claim 10, wherein the search criteria comprise an operator dependent version field that includes a string specifying an operator that provides the API and indicates whether an operator specified API is backward compatible with a standard API version, whether the operator specified API is backward compatible with an operator specified release, and whether there is a backward compatible changes to the API.

16. The method of claim 10, wherein the NF type specifies one of:

Application Function (AF);
Access and Mobility Management Function (AMF);
Authentication Server Function (AUSF);
Network Exposure Function (NEF); and
Policy Control Function (PCF).

17. A non-transitory computer-readable medium comprising computer-executable instruction, wherein the computer-executable instructions, when executed by one or more processors, cause the one or more processors to instantiate, in a memory:

register, at an updated network function (NF) service producer that includes at a Network Repository Function (NRF) using a Network Function profile (NF profile), wherein the NF profile indicates a Network Function type (NF type) and Application Programming Interface versions;

receive, at an NF service consumer, a message from a network component;

determine, at the NF service consumer, to engage a service of an NF service producer of the NF type based on the message;

send, at the NF service consumer, a discovery request to the NRF in response to the message, wherein the discovery request includes search criteria;

receive, at the NF service consumer, a search result from the NRF in response to the discovery request, wherein the search result includes a list of NFs that meet the search criteria;

select, at the NF service consumer, a particular NF from the list of NFs;

receive, at the NF service consumer, a list of different versions of the API from the particular NE;

select, at the NF service consumer, a particular version of the API, from the received list of different versions of the API; and use, at the NF service consumer, the selected particular version of the API to call at the particular NF.

18. The non-transitory computer-readable medium of claim 17, wherein the list identifies NFs of the NF type, and wherein the NFs support API versions specified by an operator dependent version field in the search criteria.

19. The non-transitory computer-readable medium of claim 17, wherein the computer-executable instructions further cause the one or more processors to send, at the NF service consumer, a request to negotiate an operator specified API version to the NFs, wherein the request includes an Operator Specified Supported Features data that specifies a vendor.

20. The non-transitory computer-readable medium of claim 17, wherein the particular NF has an API that matches the Operator Specified Supported features data.

* * * * *